United States Patent
Diederich et al.

(10) Patent No.: US 7,201,260 B2
(45) Date of Patent: Apr. 10, 2007

(54) SUBASSEMBLY FOR THE AMPLITUDE-DEPENDENT ABSORPTION OF SHOCK

(75) Inventors: Manfred Diederich, Bereborn (DE); Jan Kirch, Trier (DE); Werner Stüber, Mandem (DE)

(73) Assignee: ThyssenKrupp Bilstein GmbH, Ennepetal (DE)

( * ) Notice: Subject to any disclaimer, the term of this patent is extended or adjusted under 35 U.S.C. 154(b) by 0 days.

(21) Appl. No.: 10/854,611

(22) Filed: May 26, 2004

(65) Prior Publication Data

US 2004/0245058 A1 Dec. 9, 2004

(30) Foreign Application Priority Data

Jun. 6, 2003 (DE) ................. 103 25 877

(51) Int. Cl.
*F16F 9/49* (2006.01)
(52) U.S. Cl. .................... 188/322.15; 188/280
(58) Field of Classification Search .......... 188/322.15, 188/322.22, 280, 282.5, 282.6, 316, 317, 188/281, 282.1, 282.9; 137/493.8; 267/124, 267/127

See application file for complete search history.

(56) References Cited

U.S. PATENT DOCUMENTS

| | | | | |
|---|---|---|---|---|
| 1,605,798 A | * | 11/1926 | Van Crombrugge | 267/225 |
| 2,516,172 A | * | 7/1950 | Baldwin | 267/127 |
| 2,911,072 A | * | 11/1959 | Becker et al. | 188/315 |
| 3,232,390 A | * | 2/1966 | Chano | 188/280 |
| 4,653,617 A | * | 3/1987 | Casimir et al. | 188/282.5 |
| 5,219,414 A | * | 6/1993 | Yamaoka | 188/284 |
| 6,145,638 A | * | 11/2000 | Popjoy | 188/322.13 |
| 6,318,523 B1 | * | 11/2001 | Moradmand et al. | 188/280 |
| 6,352,145 B1 | * | 3/2002 | DeMolina et al. | 188/281 |
| 6,651,787 B2 | * | 11/2003 | Grundei | 188/280 |
| 2003/0051957 A1 | * | 3/2003 | Lemieux | 188/322.15 |
| 2004/0245058 A1 | * | 12/2004 | Diederich et al. | 188/322.15 |

FOREIGN PATENT DOCUMENTS

| | | | |
|---|---|---|---|
| DE | 1264165 | * | 10/1964 |
| DE | 3503153 | * | 8/1985 |
| DE | 10325877 | * | 1/2005 |
| EP | 1484526 A1 | * | 12/2004 |
| FR | 1053740 | * | 4/1952 |
| FR | 1419551 | * | 1/1958 |
| GB | 2328999 | * | 3/1999 |

\* cited by examiner

*Primary Examiner*—Christopher P. Schwartz
(74) *Attorney, Agent, or Firm*—Max Fogiel

(57) ABSTRACT

A subassembly for the amplitude-dependent absorption of shock, especially in a dashpot for a motor vehicle with a piston and an oscillating piston rod. The piston (3) is accommodated in a housing (2), partitioning the housing into two compartments (4 & 5), and travels up and down inside the housing, radially aligned and axially subject to motion-limiting tension, on the end of the piston rod (1). The object is a simple and reliable subassembly that takes up little additional space. The piston is accordingly axially tensioned between two springs (17 & 18).

12 Claims, 5 Drawing Sheets

SUBASSEMBLY FOR THE AMPLITUDE-DEPENDENT ABSORPTION OF SHOCK

BACKGROUND OF THE INVENTION

The present invention concerns a subassembly for the amplitude dependent absorption of shock, especially in a dashpot for a motor vehicle.

It is desirable in dashpots for motor vehicles in particular to prevent high-frequency and low-amplitude vibrations from being intercepted by the dashpot's shock-absorption mechanism itself. Such high-frequency vibrations can be initiated by the tread of the tire as it rolls over the roadway or by slight imbalances in the wheel. When such vibrations reach the overall shock-absorption mechanism, they can cause break-loose due to the stick-slip action of the piston on the mechanism's housing. The passengers will accordingly perceive disturbances in the suspension.

Several approaches to the solution of this problem have been proposed.

The elimination of resonance frequencies in motor vehicles by attaching the piston axially displaceable and spring-loaded to the end of the piston rod is known from U.S. Pat. No. 3,232,390 for example.

This solution, however, is complicated and cannot handle high frequency, low-amplitude vibrations in both directions.

SUMMARY OF THE INVENTION

The object of the present invention is accordingly a simple and reliable subassembly for the amplitude-dependent absorption of shock, a subassembly that takes up little additional space.

The main advantage of the present invention is its simplicity. Another is the little space it occupies in the housing. Finally, different components can be easily combined to attain different performance curves.

BRIEF DESCRIPTION OF THE DRAWINGS

One embodiment of the present invention will now be specified with reference to the accompanying drawing, wherein.

DETAILED DESCRIPTION OF THE PREFERRED EMBODIMENTS

A piston 3 is accommodated in the housing 2 of the illustrated dashpot for motor vehicles and rests radially against its inner surface, partitioning the housing into two compartments 4 and 5. Piston 3 travels up and down inside the housing on the end of an oscillating piston rod 1. The compartments 4 and 5 are charged with fluid. As piston rod 1 displaces piston 3 up and down inside the housing, the fluid flows though the piston, attenuating the motion of the piston rod.

Figure 1:
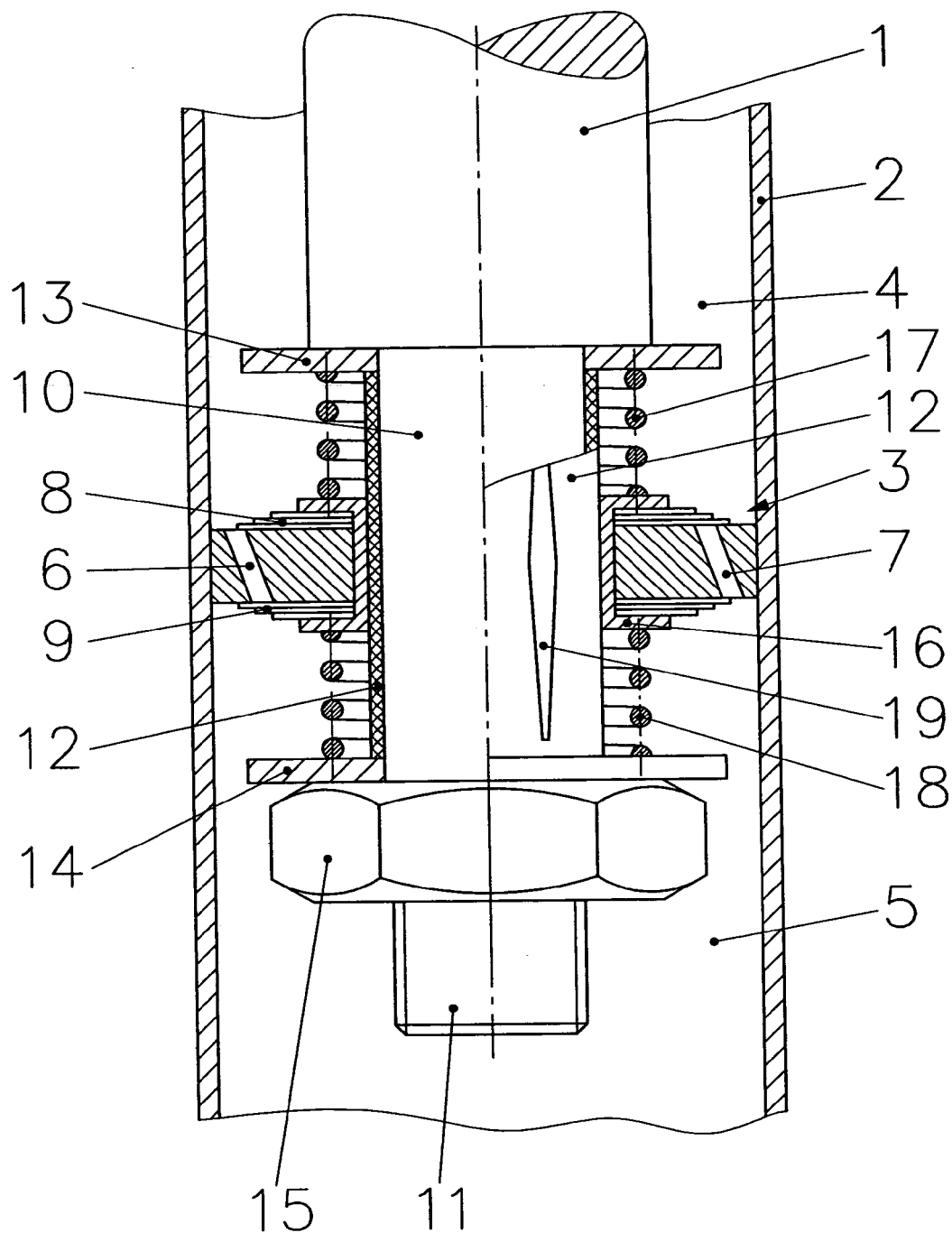
FIG. 1 is a section through the housing of a dashpot with a piston mounted on the end of a piston rod.

Piston 3 is provided with various fluid-conveying passages 6 and 7. One end of each passage 6 or 7 is, as illustrated in FIG. 1, capped by a stack 6 or 7 of cupsprings that act as one-way valves in one direction and offer flow-resistance performance characteristics in the other. This situation is depicted only schematically in the remaining figures.

The end of piston rod 1 that enters the housing is provided with a narrower extension 10 with a threaded section 11 at its lower end.

Piston 3 slides freely up and down over the narrower extension 10 of piston rod 1. Accommodated radially between the narrower extension 10 and the piston 3 in the illustrated example is a piston-rod centering sleeve 12 of preferably low-friction material. There is a motion-limiting gasket 13 and 14 at each end of piston-rod centering sleeve 12. Piston-rod centering sleeve 12 and motion-limiting gaskets 13 and 14 are axially secured over piston-rod extension 10 by a nut 15 that screws onto threaded section 11.

Piston 3 is accommodated along with its associated components (e.g. its cupsprings) in a carriage 16. Carriage 16 slides freely up and down, carrying the piston with it, whereas the cupsprings etc. are maintained therein subject to tension.

Accommodated axially between each motion-limiting gasket 13 and 14 and the face of piston 3 proximate thereto is a spring 17 and 18. As long as the pressures in compartments 4 and 5 are in equilibrium, springs 17 and 18 will maintain piston 3 halfway through the space it oscillates in, constituted by the bore through piston-rod centering sleeve 12. Furthermore, however, springs 17 and 18 resiliently limit the stroke of piston 3. These springs are depicted only schematically in FIG. 1. They can in the simplest embodiment be simple helical springs with an inside diameter slightly longer than the outside diameter of piston-rod centering sleeve 12.

As illustrated in FIG. 1, the surface of piston-rod centering sleeve 12 is provided with at least one groove 19. Groove 19 is longer than piston 3 is wide. As will be evident from the figure, groove 19 is wide at its midpoint and narrows continuously toward each motion-limiting end of piston-rod centering sleeve 12. Other shapes are also possible in accordance with specific requirements. The nut can even be straight.

Groove 19 acts as a bypass for ensuring an equal distribution of fluid between compartments 4 and 5. When the difference in pressure between the two compartments is only slight, the fluid will be allowed to flow through groove 19 with no motion on the part of piston 3 in relation to piston-rod centering sleeve 12.

Figure 2:
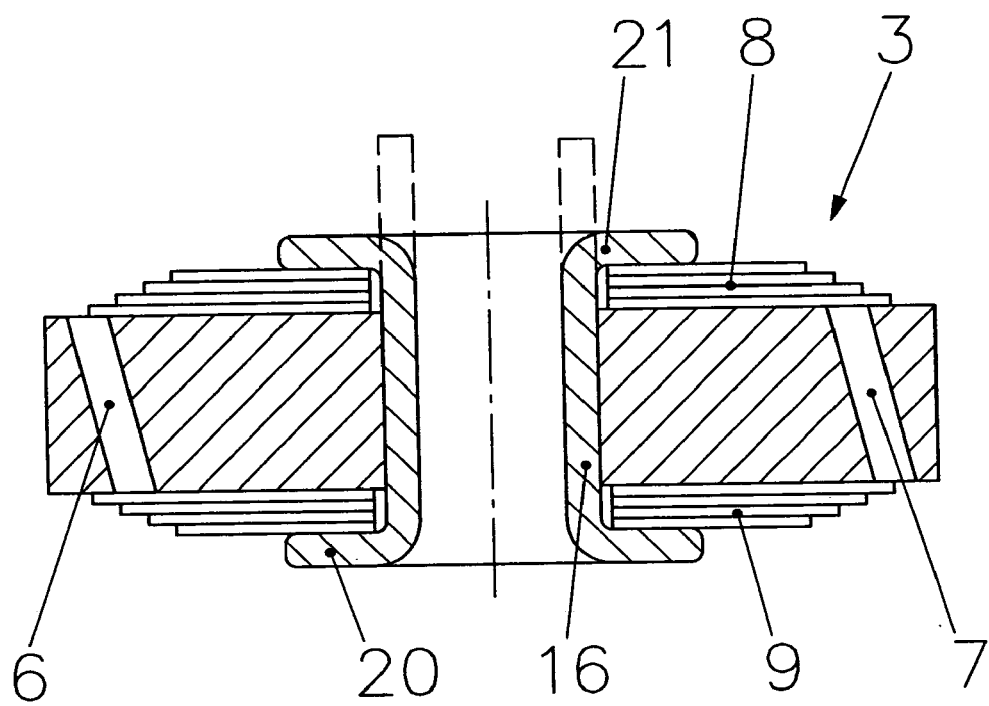
FIGS. 2 through 5 illustrate different kinds of piston.

FIGS. 2 through 5 depict various embodiments of piston carriage 16. The piston carriage 16 illustrated in FIG. 2 is originally in the form of a bushing with a flange 20 at one end. A piston 3 is then mounted along with cupspring stacks 8 and 9 around the bushing. The other end of the bushing, represented by the broken lines, is then upset outward to create another flange 21.

Figure 3:
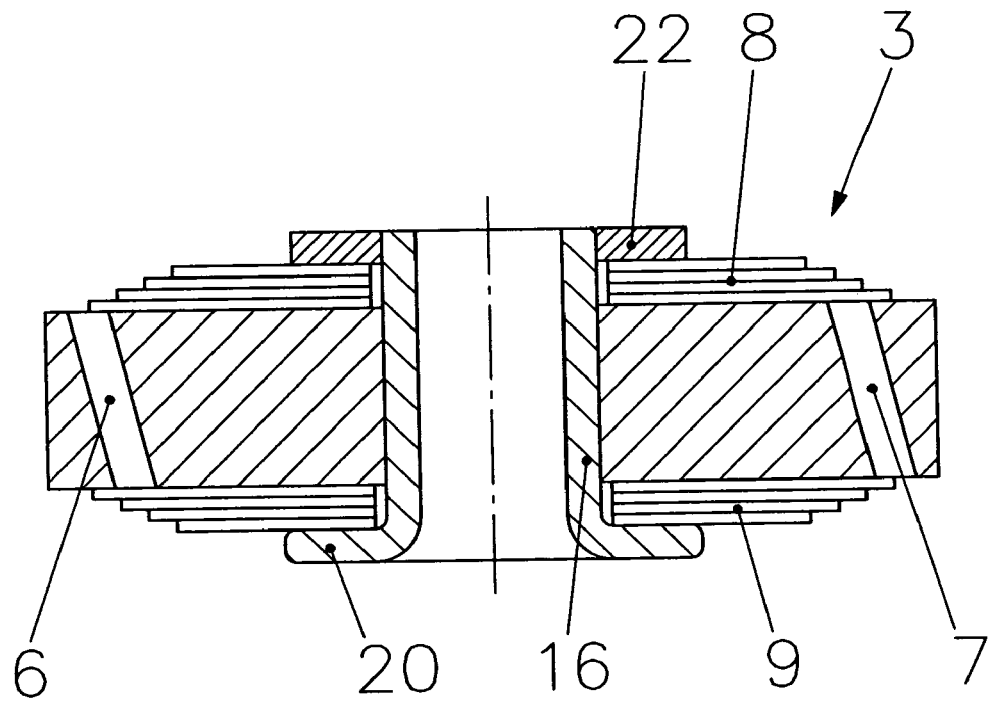

The piston carriage 16 illustrated in FIG. 3 also originates as a bushing with a flange 20 at only one end. The whole is then secured with a ring 22 swaged, pressed, or welded into place.

Figure 4:
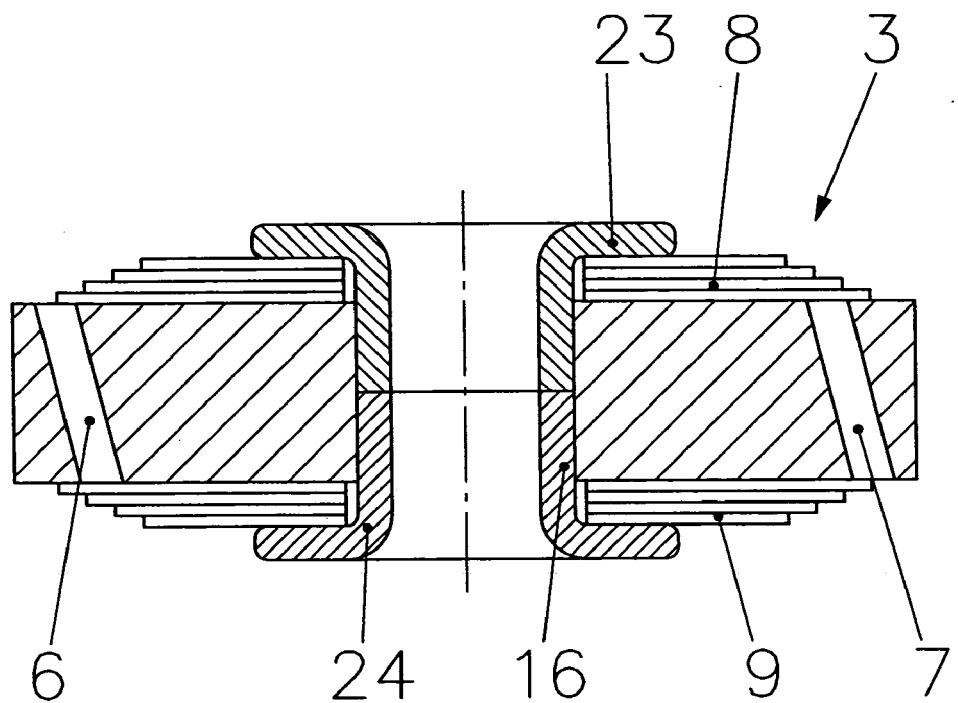

The piston carriage 16 illustrated in FIG. 4 originates with two bushings, each with a flange 23 or 24 at one end. Once the components have been inserted, the bushings are pressure-welded together halfway up.

Figure 5:
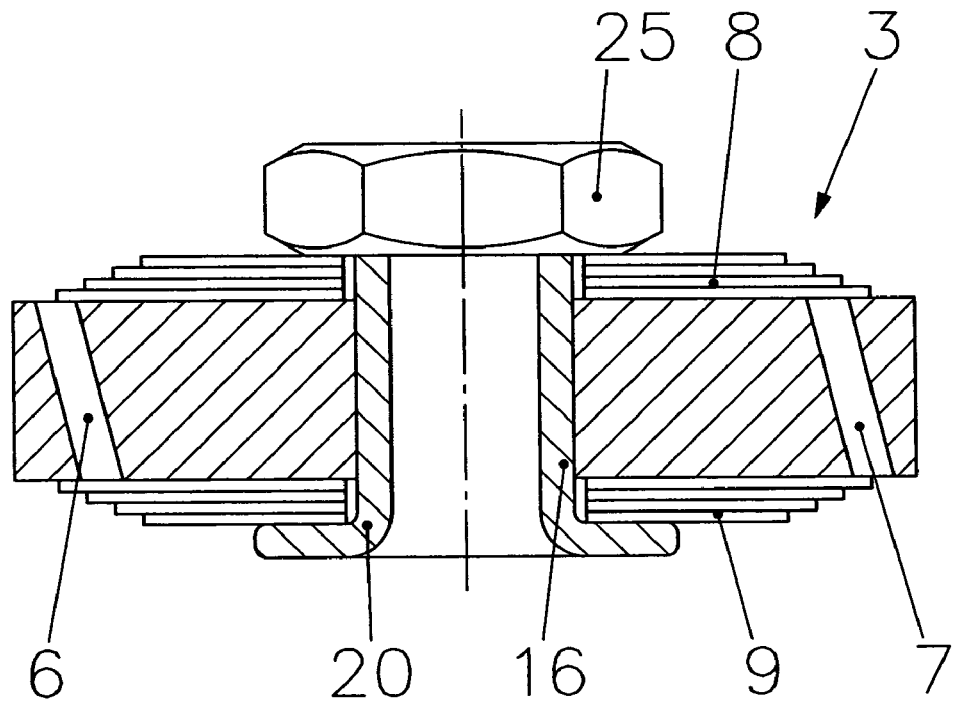

The point of departure for the piston carriage 16 illustrated in FIG. 5 is a bushing with a flange 20 at one end. The projecting end of the bushing is provided with an outside thread. The carriage is finally assembled by means of a nut 25 that screws onto the threading.

Figure 6:
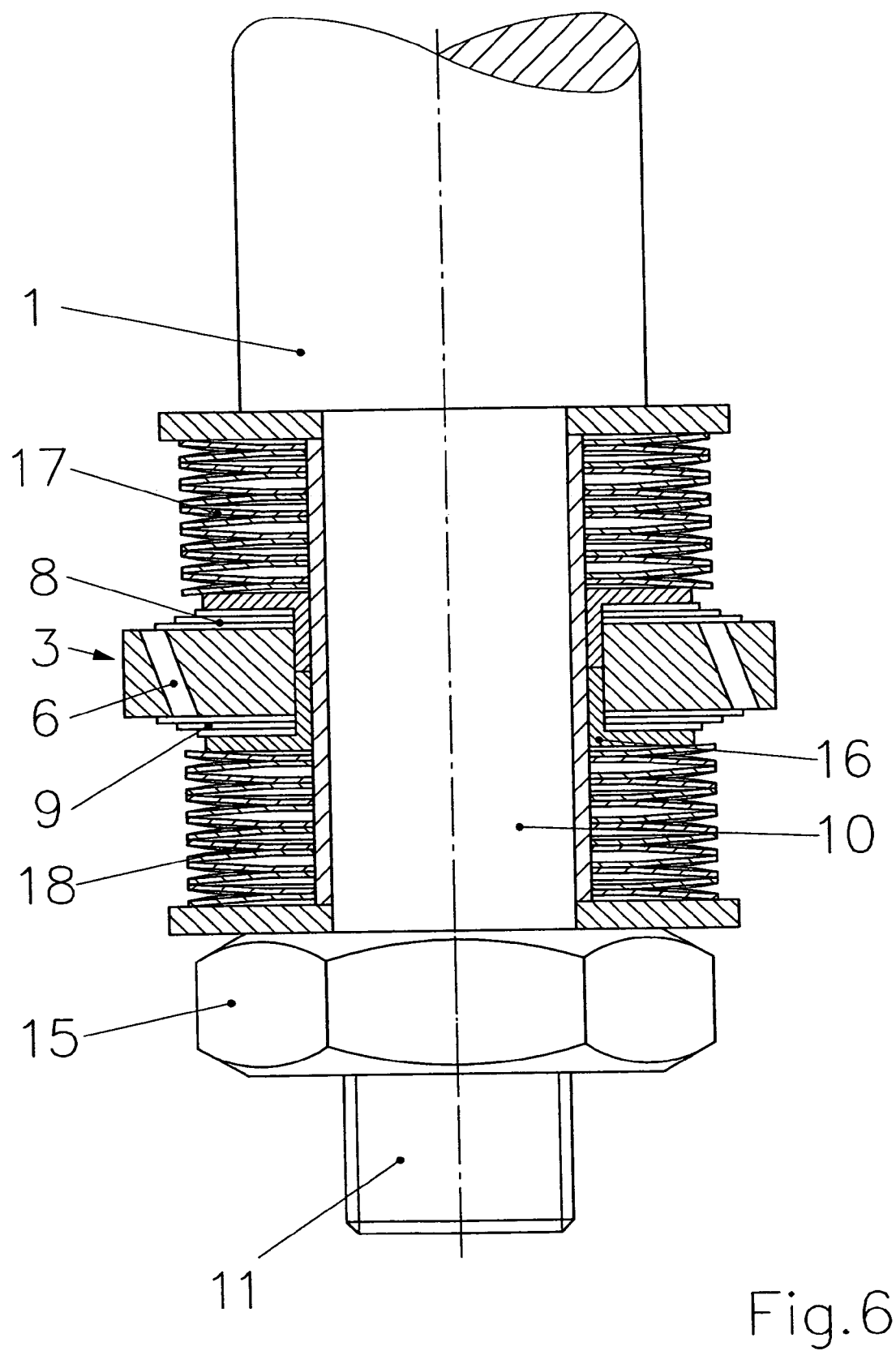
FIG. 6 is a section along the midplane through the end of a piston rod with a piston mounted on it and secured by stacks of cupsprings.

The springs 17 and 18 illustrated in FIG. 6 are stacks, of belleville springs in the illustrated embodiment. Cupsprings, however, could be employed just as well.

Figure 7:
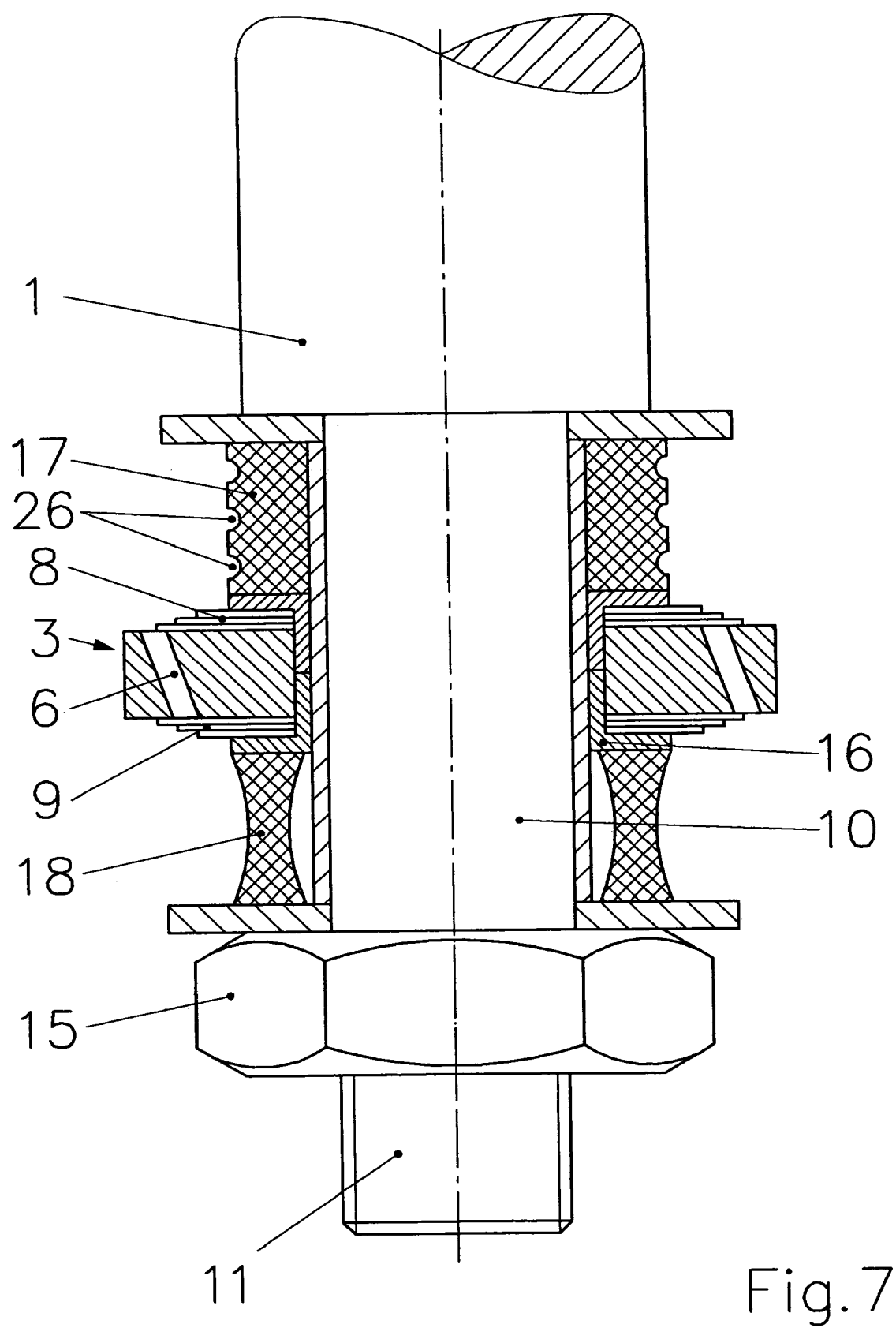
FIG. 7 is a section similar to that in FIG. 6 but with plastic bumpers instead of springs.

The embodiment illustrated in FIG. 7 employs, instead of springs, plastic buffers 17 and 18 with straight or curved walls. The buffer illustrated at the top of the figure is in the form of a block with grooves 26 extending around its outer surface. The buffer at the bottom is thinner halfway up than it is at each end.

LIST OF PARTS 1. piston rod
2. housing
3. piston
4. compartment
5. compartment
6. passage
7. passage
8. cupspring
9. cupspring
10. piston-rod extension
11. threaded section
12. piston-rod centering sleeve
13. motion-limiting gasket
14. motion-limiting gasket
15. nut
16. piston carriage
17. spring
18. spring
19. groove
20. flange
21. flange
22. ring
23. flange
24. flange
25. nut
26. groove

The invention claimed is:

1. An arrangement for amplitude-dependent shock absorption for motor vehicles, comprising: a damping housing; a piston connected to an oscillating piston rod projecting into said housing, said piston being radially guided and axially spring-loaded with limited motion dividing said housing into two damping chambers; two springs for tensioning said piston between said springs; said piston rod terminating in an extension surrounded by said piston; a guidance bushing between said extension and said piston, said bushing having an outer cylindrical guiding surface, said piston sliding over said guiding surface with sliding motion relative to said bushing, said guiding surface guiding sliding motion of said piston relative to said bushing at least one axially extending groove on the outer circumference of said bushing and having a length greater than a height of a corresponding bore in said piston, said groove being a bypass between said two chambers.

2. An arrangement as defined in claim 1, wherein said groove has a varying cross-section along said length.

3. An arrangement as defined in claim 1, wherein one of said springs is located above said piston and the other one of said springs is located below said piston, said springs having different stiffness and resilience.

4. An arrangement as defined in claim 1, wherein at least one of said springs has a progressive, linear or degressive resilience.

5. An arrangement as defined in claim 1, wherein said springs are steel springs.

6. An arrangement as defined in claim 1, wherein said springs are plastic springs.

7. An arrangement as defined in claim 1, wherein said springs are each comprised of a plurality of individual springs assembled in a package.

8. An arrangement as defined in claim 1, wherein said groove is wide at a midpoint of said groove and narrows continuously to each end of said bushing, said bushing being a piston rod centering sleeve.

9. An arrangement as defined in claim 1, wherein said groove comprises a bypass for substantially equal distribution of fluid between said damping chambers.

10. An arrangement as defined in claim 1, wherein fluid flows through said groove when said damping chambers have a substantially slight difference in pressure without relative motion occurring between said piston and said bushing.

11. An arrangement for amplitude-dependent shock absorption for motor vehicles, comprising: a damping housing; a piston connected to an oscillating piston rod projecting into said housing, said piston rod being radially guided and axially spring-loaded with limited motion dividing said housing into two damping chambers; two springs for tensioning said piston between said springs; said piston rod terminating in an extension surrounded by said piston; a guidance bushing between said extension and said piston, said bushing having an outer cylindrical guiding surface, said piston sliding over said guiding surface with sliding motion relative to said bushing, said guiding surface guiding sliding motion of said piston relative to said bushing at least one axially extending groove on the outer circumference of said bushing and having a length greater than a height of a corresponding bore in said piston; said groove comprising a bypass for substantially equal distribution of fluid between said damping chambers, said fluid flowing through said groove when said damping chambers have a substantially slight difference in pressure without relative motion occurring between said piston and said bushing.

12. An arrangement for amplitude-dependent shock absorption for motor vehicles, comprising: a damping housing; a piston connected to an oscillating piston rod projecting into said housing, said piston rod being radially guided and axially spring-loaded with limited motion dividing said housing into two damping chambers; two springs for tensioning said piston between said springs; said piston rod terminating in an extension surrounded by said piston; a guidance bushing between said extension and said piston, at least one axially extending groove on the outer circumference of said bushing and having a length greater than a height of a corresponding bore in said piston; said groove having a varying cross-section along said length; one of said springs being located above said piston and the other one of said springs being located below said piston, said springs having different stiffness and resilience; at least one of said springs having a progressive, linear or degressive resilience; said springs comprising steel springs; said springs being each comprised of a plurality of individual springs assembled in a package; said groove being wide at a midpoint of said groove and narrowing continuously to each end of said bushing, said bushing being a piston rod centering sleeve; said groove comprising a bypass for substantially equal distribution of fluid between said damping chambers; said fluid flowing through said groove when said damping chambers have a substantially slight difference in pressure without relative motion occurring between said piston and said bushing.

* * * * *